(12) United States Patent
Achiwa

(10) Patent No.: US 11,137,946 B2
(45) Date of Patent: Oct. 5, 2021

(54) IMAGE PROCESSING APPARATUS, METHOD FOR CONTROLLING THE SAME AND STORAGE MEDIUM

(71) Applicant: CANON KABUSHIKI KAISHA, Tokyo (JP)

(72) Inventor: Ken Achiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/520,821

(22) Filed: Jul. 24, 2019

(65) Prior Publication Data

US 2020/0050405 A1 Feb. 13, 2020

(30) Foreign Application Priority Data

Aug. 7, 2018 (JP) .............................. JP2018-148853

(51) Int. Cl.
*G06F 3/06* (2006.01)
*G06F 3/12* (2006.01)

(52) U.S. Cl.
CPC .......... *G06F 3/0673* (2013.01); *G06F 3/1253* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,404,994 B1 | 6/2002 | Kawai et al. | |
| 7,167,258 B2 * | 1/2007 | Yamamoto | H04N 1/00127 358/1.13 |
| 8,219,555 B1 * | 7/2012 | Mianji | G06F 16/38 707/736 |
| 8,842,325 B2 | 9/2014 | Achiwa | |
| 2001/0015972 A1 * | 8/2001 | Horiguchi | H04M 3/493 370/352 |
| 2001/0032266 A1 | 10/2001 | Minowa | |
| 2002/0116631 A1 * | 8/2002 | Torii | H04L 63/1416 726/26 |
| 2002/0180782 A1 * | 12/2002 | Natsuno | G06F 21/10 715/743 |
| 2003/0233488 A1 * | 12/2003 | Ozaki | G06F 3/1287 719/321 |

(Continued)

FOREIGN PATENT DOCUMENTS

JP 2004110315 A 4/2004
JP 2008-276437 A 11/2008

OTHER PUBLICATIONS

Copending, unpublished, U.S. Appl. No. 16/527,256 to Ken Achiwa, filed Jul. 31, 2019.

*Primary Examiner* — Anh-Vinh T Nguyen
(74) *Attorney, Agent, or Firm* — Venable LLP

(57) ABSTRACT

In an image processing apparatus, an acquisition unit acquires relevant content related to a document included in a job inputted into the image processing apparatus, and a display control unit displays the acquired relevant content on a display unit of the image processing apparatus. An acceptance unit accepts a selection of one of a plurality of output forms from a user, as an output form for the relevant content displayed on the display unit. A control unit generates a job for outputting the accepted relevant content in the output form and controls execution of the generated job.

20 Claims, 7 Drawing Sheets

(56) References Cited

U.S. PATENT DOCUMENTS

| | | | | |
|---|---|---|---|---|
| 2004/0030649 A1* | 2/2004 | Nelson | G06Q 20/40 | 705/44 |
| 2004/0169880 A1* | 9/2004 | Nakanishi | G06F 3/1286 | 358/1.15 |
| 2004/0223182 A1* | 11/2004 | Minagawa | G06F 3/1225 | 358/1.15 |
| 2006/0133844 A1* | 6/2006 | Konno | G06F 3/125 | 399/82 |
| 2006/0184543 A1* | 8/2006 | Fukuta | H04N 1/00344 | |
| 2007/0115498 A1* | 5/2007 | Noel | G06Q 30/02 | 358/1.15 |
| 2008/0052768 A1* | 2/2008 | Tamura | G06F 21/608 | 726/4 |
| 2008/0120293 A1* | 5/2008 | Morisawa | G06F 16/9537 | |
| 2008/0263036 A1* | 10/2008 | Yamamoto | G06F 16/583 | |
| 2009/0147306 A1* | 6/2009 | Sugiyama | G06F 3/1238 | 358/1.15 |
| 2009/0273810 A1* | 11/2009 | Gupta | G06Q 30/02 | 358/1.18 |
| 2009/0288128 A1* | 11/2009 | Oida | H04N 21/4314 | 725/112 |
| 2010/0079781 A1* | 4/2010 | Yamamoto | H04N 1/2179 | 358/1.13 |
| 2010/0082709 A1* | 4/2010 | Yamamoto | G06F 16/93 | 707/812 |
| 2010/0131459 A1* | 5/2010 | Todaka | G06Q 10/10 | 707/608 |
| 2010/0177965 A1* | 7/2010 | Kanematsu | G06K 9/03 | 382/182 |
| 2011/0176163 A1* | 7/2011 | Towata | H04N 1/00233 | 358/1.15 |
| 2011/0184947 A1* | 7/2011 | Watanabe | G06F 16/9574 | 707/736 |
| 2011/0242594 A1* | 10/2011 | Yabe | G06F 3/1287 | 358/1.15 |
| 2013/0229690 A1* | 9/2013 | Sumita | H04N 1/00408 | 358/1.15 |
| 2013/0283313 A1* | 10/2013 | Miyamoto | H04N 21/2747 | 725/37 |
| 2014/0123038 A1* | 5/2014 | Ahn | G06F 3/0486 | 715/761 |
| 2014/0176995 A1* | 6/2014 | Nakawaki | H04N 1/00244 | 358/1.15 |
| 2016/0062933 A1* | 3/2016 | Kanomata | G06F 9/4413 | 710/9 |
| 2016/0132931 A1* | 5/2016 | Levinson | G06Q 30/0277 | 705/14.45 |
| 2017/0310835 A1* | 10/2017 | Kyoo | G06F 3/1237 | |
| 2018/0082155 A1* | 3/2018 | Ishii | G06K 9/6267 | |
| 2018/0254944 A1* | 9/2018 | Inagi | H04L 41/0631 | |
| 2019/0082499 A1* | 3/2019 | Miyazawa | H04W 8/18 | |
| 2019/0289011 A1* | 9/2019 | Kamiya | G06F 16/122 | |
| 2019/0291277 A1* | 9/2019 | Oleynik | B25J 9/163 | |
| 2020/0050405 A1* | 2/2020 | Achiwa | G06F 3/1219 | |
| 2020/0053237 A1* | 2/2020 | Achiwa | G06F 3/0416 | |

* cited by examiner

FIG. 6

| | 501 | 502 | 503 | 504 | 505 | 506 |
|---|---|---|---|---|---|---|
| | COPY | PRINT ANYWHERE | SCAN AND SEND | SCAN AND SAVE | FAX | BROWSER |

PLEASE SELECT JOB.

| SELECT | JOB NAME | PRINT SETTING | NUMBER OF SHEETS | NUMBER OF COPIES | ESTIMATED TIME |
|---|---|---|---|---|---|
| ☑ | XX MARKET INVESTIGATION.ppt | AUTO (COLOR/BLACK AND WHITE) A4 | 8 | 1 | 3 MINUTES |
| ☑ | XX TECHNICAL EXAMINATION.doc | AUTO (COLOR/BLACK AND WHITE) A4 | 12 | 1 | 2 MINUTES |

<PRINT SETTING> — 611

[NUMBER OF SHEETS] 2 / ↑→  [NUMBER OF COPIES] 1 / ↑→  CLOSE — 616

[PRINT RANGE] LET THE SYSTEM DECIDE (AGGREGATE PRINTING) CHANGE

[COLOR SELECTION] AUTO (COLOR/BLACK AND WHITE) CHANGE

▼

- 612
- 613
- 614
- 615

| PRINT SETTING | PREVIEW DISPLAY | DELETE JOB | START PRINT |
|---|---|---|---|
| 602 | 603 | 604 | 605 |

IMAGE PROCESSING APPARATUS, METHOD FOR CONTROLLING THE SAME AND STORAGE MEDIUM

BACKGROUND OF THE INVENTION

Field of the Invention

The present invention relates to an image processing apparatus, a method for controlling the same, and a storage medium.

Description of the Related Art

Generally, the forms in which content used in the field of marketing such as an advertisement is provisioned are roughly divided into pull-type and push-type provision forms. The pull-type provision form is a form in which the user actively goes and obtains the content (e.g., performs a search). The push-type provision form is a form in which a user passively receives the content (e.g., a recommendation).

A recommendation system belonging to the push-type provision form combines content-based filtering and cooperative filtering to calculate and evaluate the similarity of content. Thus, a recommendation system provides content that is likely to be beneficial to a target user (e.g., related products or related articles). In addition, methods for realizing such a recommendation system using a display unit in an image processing apparatus such as an MFP have been proposed. For example, Japanese Patent Laid-Open No. 2004-110315 discloses a technique of displaying Internet-based content on a display unit of a printing device and converting the displayed content into print data.

The above-mentioned prior art has the following problems. In the above-described system, content displayed on an image processing apparatus such as a printer can be printed as is. However, only printing can be selected as a content output form, and so there is a limitation in output forms that can be selected by the user in order to view the content.

SUMMARY OF THE INVENTION

The present invention provides a technique for allowing a user to select an appropriate output form for viewing content when providing the user with content related to a document included in a job inputted into an image processing apparatus.

According to one aspect of the present invention, there is provided an image processing apparatus comprising: an acquisition unit configured to acquire relevant content related to a document included in a job inputted into the image processing apparatus; a display control unit configured to display the relevant content acquired by the acquisition unit on a display unit of the image processing apparatus; an acceptance unit configured to accept a selection of one of a plurality of output forms from a user, as an output form for the relevant content displayed on the display unit; and a control unit configured to generate a job for outputting the relevant content in the output form accepted by the acceptance unit and to control execution of the generated job.

According to another aspect of the present invention, there is provided a method for controlling an image processing apparatus, the method comprising: acquiring relevant content related to a document included in a job inputted into the image processing apparatus; displaying the acquired relevant content on a display unit of the image processing apparatus; accepting a selection of one of a plurality of output forms from a user, as an output form for the relevant content displayed on the display unit; and generating a job for outputting the relevant content in the accepted output form and controlling execution of the generated job.

According to still another aspect of the present invention, there is provided a non-transitory computer-readable storage medium storing a computer program for causing a computer to execute a method for controlling an image processing apparatus, the method comprising: acquiring relevant content related to a document included in a job inputted into the image processing apparatus; displaying the acquired relevant content on a display unit of the image processing apparatus; accepting a selection of one of a plurality of output forms from a user, as an output form for the relevant content displayed on the display unit; and generating a job for outputting the relevant content in the accepted output form and controlling execution of the generated job.

Further features of the present invention will become apparent from the following description of exemplary embodiments (with reference to the attached drawings).

BRIEF DESCRIPTION OF THE DRAWINGS

FIG. 6 is a diagram illustrating an example of a setting screen for performing setting related to printing of a related document.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
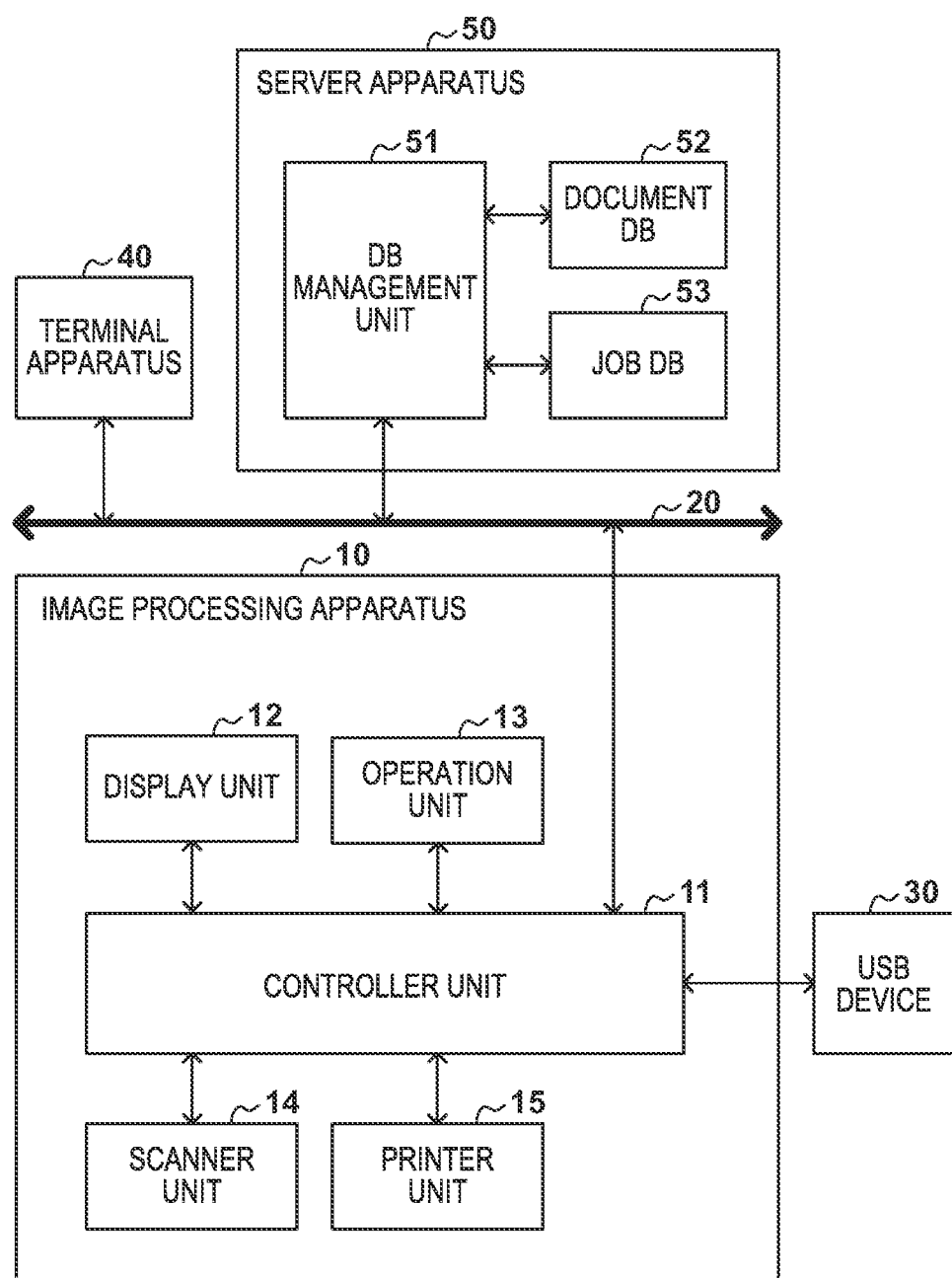
FIG. 1 is a block diagram illustrating an example of an overall configuration of an image processing system.

FIG. 1 is a block diagram illustrating an example of an overall configuration of an image processing system according to the present embodiment. As illustrated in FIG. 1, the image processing system of the present embodiment is configured by an image processing apparatus 10, a terminal apparatus 40, and a server apparatus 50, which are connected to each other via a network 20. Although FIG. 1 illustrates a configuration in which one image processing apparatus 10 is connected to the network 20, a plurality of the image processing apparatuses 10 may be connected to the network 20. Also, for the terminal apparatus 40 and the server apparatus 50, a plurality of apparatuses may be connected to the network 20. In the present embodiment, the image processing apparatus 10 can communicate with the server apparatus 50 via the network 20.

The image processing apparatus 10 is configured by an MFP or the like that is capable of performing a plurality of functions such as copying, printing, scanning, faxing, and the like. The image processing apparatus 10 of the present embodiment is configured by a controller unit 11, a display unit 12, an operation unit 13, a scanner unit 14, and a printer unit 15. The internal configuration of the controller unit 11 will be described separately in detail with reference to FIG. 2.

The network 20 is composed of a LAN, a public line (WAN), or the like. The network 20 communicatively connects the image processing apparatus 10, the terminal apparatus 40, and the server apparatus 50 to each other. A USB device 30 is an external storage device detachably connected to the image processing apparatus 10 and capable of reading and writing data. The USB device 30 is used, for example, to read data for printing by the image processing apparatus 10 and to write data obtained by scanning by the image processing apparatus 10.

The terminal apparatus 40 is configured by a general-purpose personal computer (PC) or the like, and transmits data for printing by the image processing apparatus 10 and receives data obtained by scanning by the image processing apparatus 10. Although FIG. 1 illustrates a configuration in which the terminal apparatus 40 is wire-connected to the network 20, for example, a configuration in which the terminal apparatus 40 is configured by a mobile device such as a tablet and is wirelessly connected to the network 20 via a wireless LAN access point may be used.

The server apparatus 50 is configured by a control unit for managing a database (DB) and a storage unit in which the DB is provided. The server apparatus 50 of the present embodiment is configured by a DB management unit 51, a document DB 52, and a job DB 53. The server apparatus 50 may be configured by a plurality of independent server apparatuses. For example, the server apparatus 50 may be configured by a server apparatus in which dedicated devices for analyzing data, such as a CPU, a RAM, a ROM and the like, are mounted, and a server apparatus in which dedicated devices for storing data, such as an HDD and the like, are mounted.

The DB management unit 51 is configured by devices such as a CPU, a RAM, a ROM, and the like, and manages the document DB 52 and the job DB 53. The document DB 52 is a DB (storage unit) for storing a group of documents that may be content to be displayed as a recommendation on the display unit 12 of the image processing apparatus 10. The job DB 53 is a DB (storage unit) for storing information of a job inputted into the image processing apparatus 10 and document data included in the job. The flow of processing using each DB will be described later with reference to FIG. 3 and FIG. 4.

The DB management unit 51 of the present embodiment performs the following various processes:
- a process of storing data in the document DB 52 in response to a request from a user who operates the terminal apparatus 40;
- a process of monitoring jobs inputted into the image processing apparatus 10 by a user and storing job information and document data included in the job in the job DB 53;
- a process of monitoring jobs inputted into the image processing apparatus 10 by a user and analyzing document content included in the job by using natural language processing; and
- a process of monitoring jobs inputted into the image processing apparatus 10 by a user and searching the group of documents stored in the document DB 52 for candidates for content to be displayed as a recommendation.

Here, the content of a document in the present embodiment refers to the text information constituting document data included in the job. More specifically, the document content is composed of various text information such as a body, a header, a footer, a page number, and character strings in a diagram in an Office document such as a Word document, an Excel document, or a PowerPoint document. Note that any of the above-described text information can be held as a component of application data described in XML or the like. The above-described text information is, for example, PDL (page description language) data in print job. Alternatively, the above-described text information is text information that can be extracted from data obtained as a result of an OCR (optical character recognition) process on image data obtained by scanning an image of a document in a scan job, a copy job, or a FAX transmission job.

<Image Processing Apparatus Configuration>

Figure 2:
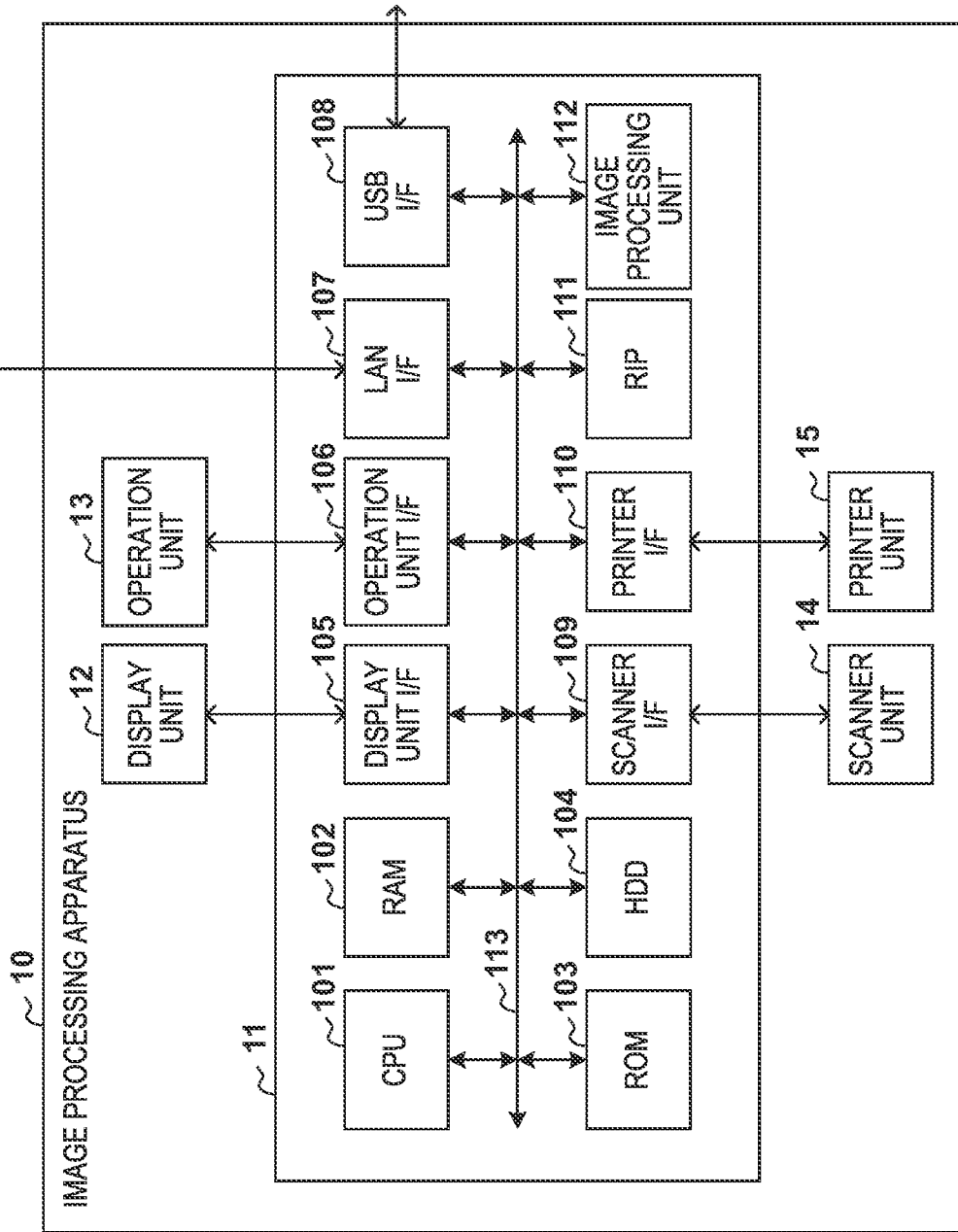
FIG. 2 is a block diagram illustrating an example of a hardware configuration of an image processing apparatus.

FIG. 2 is a block diagram illustrating an example of a hardware configuration of the image processing apparatus 10. As illustrated in FIG. 2, the controller unit 11 is connected to the scanner unit 14, which is an image input device, and the printer unit 15, which is an image output device, and is connected to a network 20. As a result, the controller unit 11 controls input/output of data for image processing.

A CPU 101 controls the entire controller unit 11. The CPU 101 interprets, for example, PDL data inputted from the terminal apparatus 40 via the network 20, and performs processing for converting the data into a display list. In addition, the CPU 101 executes OCR processing on the scanned image data inputted from the scanner unit 14, and performs a process of generating a character recognition result.

A RAM 102 is a storage device in which programs and data for the CPU 101 to control the image processing apparatus 10 are temporarily stored. A ROM 103 is a storage device in which a boot program for the CPU 101 to activate the image processing apparatus 10 is stored. An HDD (hard disk drive) 104 is a storage device for storing programs and data required to cause the image processing apparatus 10 to operate. The HDD 104 is used to store (save) image data in the image processing apparatus 10, for example, if an instruction to save image data to a box is made. Instead of the HDD, a storage device such as an SSD may be used.

A display unit I/P 105 is an interface for connecting the controller unit 11 and the display unit 12, and outputs image data to be displayed on the display unit 12 to the display unit 12. An operation unit I/F 106 is an interface for connecting the controller unit 11 and the operation unit 13, and transmits, to the CPU 101, instruction information inputted by the user via the operation unit 13.

A LAN I/P 107 is an interface for connecting the controller unit 11 and the network 20, and transmits and receives image data and control information between the image processing apparatus 10 and external apparatuses (e.g., the terminal apparatus 40 and the server apparatus 50). A USB I/P 108 is an interface for connecting the controller unit 11 and the USB device 30. The USB I/P 108 is an interface for transmitting and receiving, to and from the USB device 30, print data used for printing by the image processing apparatus 10 and scan data obtained by scanning.

A scanner I/P 109 is an interface for connecting the controller unit 11 and the scanner unit 14. The scanner I/F 109 executes correction processing in accordance with device characteristics of the scanner unit 14 on an input signal from the scanner unit, and transmits the obtained image data to the CPU 101. A printer I/P 110 is an interface for connecting the controller unit 11 and the printer unit 15. The printer I/P 110 performs, on image data for printing, a correction process in accordance with device characteristics of the printer unit 15, and transmits the obtained image data (output signals) to the printer unit 15.

An RIP 111 outputs raster-format image data by performing a rendering process on a vector-format display list generated by the CPU 101 interpreting PDL data. An image processing unit 112 performs editing processes such as rotating, scaling, compression, and expansion on image data handled in the controller unit 11.

The display unit 12 is configured by a liquid crystal display or the like, and is used to display operating screens (setting screens) of the image processing apparatus 10 to the user. In the present embodiment, the display unit 12 is also used for displaying content information such as related documents recommended by the image processing apparatus 10 to the user. The operation unit 13 is configured by a touch panel, hard keys, and the like, and is used to accept operational input from a user to the image processing apparatus 10. In the present embodiment, the operation unit 13 is also used for accepting operational input corresponding to an instruction for outputting a related document that the image processing apparatus 10 has displayed as a recommendation to the user.

The scanner unit 14 is an image input device that optically reads a recording medium on which characters, diagrams, photographs, or the like have been printed and generates image data. The printer unit 15 is an image output device that prints an image on a recording medium based on image data inside the image processing apparatus 10.

<Processing for Displaying Related Document>

Figure 3:
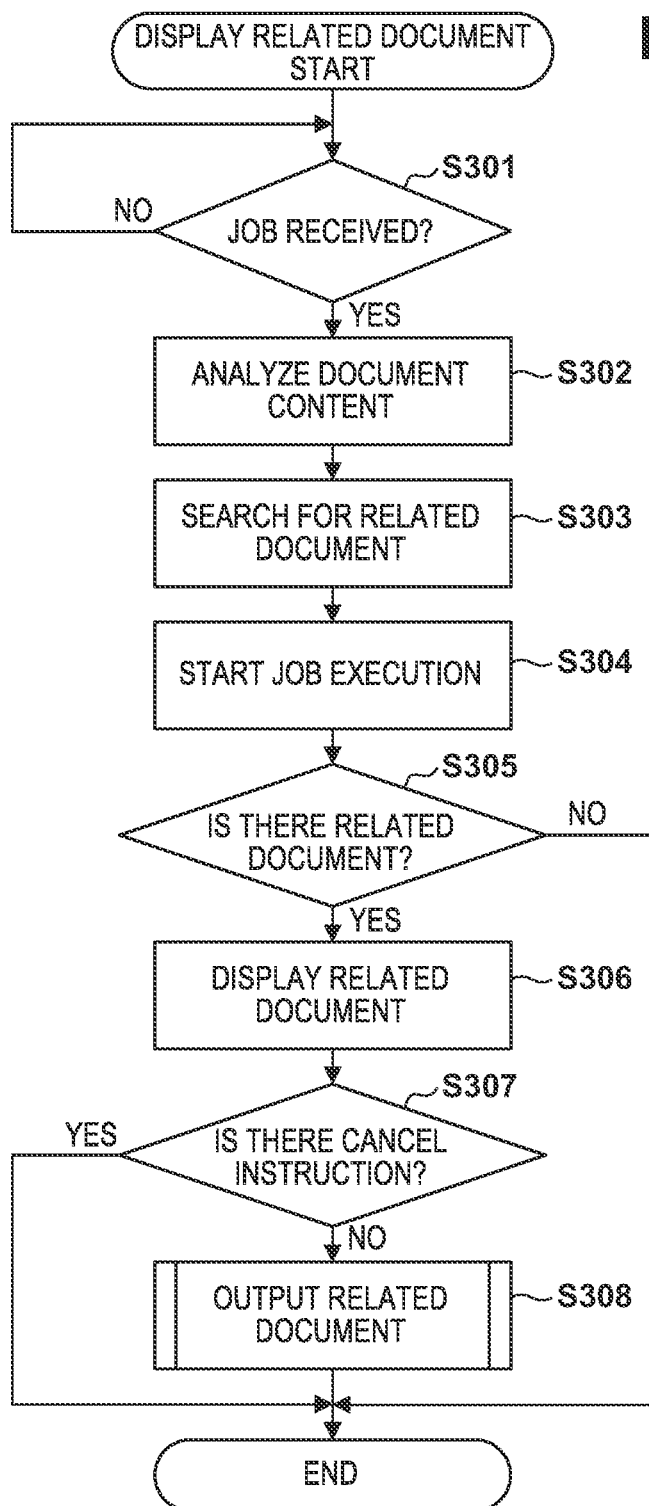
FIG. 3 is a flowchart illustrating a procedure of processing for displaying a related document.

FIG. 3 is a flowchart illustrating a procedure of processing for displaying a related document in the image processing system according to the present embodiment. The processing of each step illustrated in FIG. 3 is realized by the CPU 101 reading and executing programs stored in a storage device such as the RAM 102 or the ROM 103 in the image processing apparatus 10. The processing of some of the steps illustrated in FIG. 3 may be executed by the server apparatus 50. In such a case, for example, a CPU of the DB management unit 51 may execute a program stored in a RAM or a ROM of the DB management unit 51 on the server apparatus 50 to realize this processing based on a request from the CPU 101.

In step S301, the CPU 101 determines whether or not a job such as copying, printing, scanning, faxing, or the like has been received from an external apparatus via the LAN I/F 10 or via the operation unit 13 (that is, whether a job input has been accepted). That is, the CPU 101 performs an acceptance process for accepting input of a job. If a job is received ("YES" in step S301), the CPU 101 advances the process to step S302, and if a job is not received ("NO" in step S301), the CPU 101 repeats the determination processing of step S301 to wait until a job is received.

In step S302, the CPU 101 stores the data of the job (target job) received in step S301 in the job DB 53, and analyzes the content of a document included in the job. Specifically, the CPU 101 converts the content of the document included in the target job into text information, and analyzes the obtained text information. Specifically, the CPU 101 obtains text information corresponding to the content of the document included in the target job, and analyzes the text information. As described above, text information configured in a data format that does not depend on the job type of the image processing apparatus 10 is a target of analysis. The CPU 101 generates a feature vector representing content of the document by analyzing such text information.

For example, if the target job is a PDL print job, a feature vector calculation process is performed on the text information included in the PDL data by using natural language processing such as Word2Vec or Doc2Vec. If the target job is a scan transmission job, a feature vector calculation process is similarly performed on the text information corresponding to an OCR result obtained by analyzing the scan image data, by using natural language processing such as Word2Vec or Doc2Vec. If the target job is a copy job or a FAX transmission job, text information corresponding to an OCR result can be handled in a similar manner to in the case of a scan transmission job. In this manner, a feature vector is generated by performing natural language processing on text information corresponding to content of a document included in a target job.

Processing of the above-described step S302 generally puts a heavy load on the CPU in some cases. For this reason, for example, a configuration may be used in which the DB management unit 51 (CPU or the like) of the server apparatus 50 executes the above-described processing in accordance with an instruction from the CPU 101 of the image processing apparatus 10, and notifies the image processing apparatus 10 of a result of the processing.

Next, in step S303, the CPU 101 searches, by using the feature vector of the content of the document analyzed in step S302, the document DB 52 of the server apparatus 50 for content (relevant content) estimated to be a related document that is related to that document. Here, the CPU 101 uses the feature vector generated in step S302 to search for relevant content, based on similarity between the content of each document stored as content in the document DB 52 and the content of the document included in the target job.

When the group of documents of the document DB 52 that is made to be the target of the search in step S303 is stored in the document DB 52, the DB management unit 51 executes a process similar to step S302 (feature vector calculation process) on that group of documents. For this reason, it is assumed that feature vector information generated by this process is held in the document DB 52. That is, it is assumed that the document DB 52 holds a feature vector corresponding to each of a plurality of documents stored as content in the DB. Therefore, the CPU 101 searches for relevant content based on a similarity between a feature vector generated in step S302 and feature vectors corresponding to the respective documents held in the document DB 52.

The plurality of documents stored as content in the document DB 52 may be clustered into a plurality of clusters based on similarity of corresponding feature vectors. In step S303, the CPU 101 may search for relevant content among clusters, within the plurality of clusters, corresponding to a feature vector generated in step S302. Specifically, the CPU 101 performs a clustering process on a plurality of clusters based on a result of calculating similarity between feature vectors of documents using, for example, a K-means method, an X-means method, or the like. Thereafter, an estimation is performed to identify content in the group of documents included in the cluster that has a high degree of similarity.

Note that typically there are cases where the processing of the above-described step S303 puts a heavy load on the CPU. For this reason, for example, a configuration may be used in which the DB management unit 51 (CPU or the like) of the server apparatus 50 executes the above-described processing in accordance with an instruction from the CPU 101 of the image processing apparatus 10, and notifies the image processing apparatus 10 of a result of the processing.

Next, in step S304, the CPU 101 starts executing the job received in step S301. That is, the CPU 101 controls execution of the job so that the execution of image processing requested by the job is started in accordance with the content of the job to be executed (a job for copying, printing, scanning, scan transmission, FAX transmission, or the like). For example, if executing a copy, scan transmission, or FAX transmission job, the CPU 101 controls the scanner unit 14 to start a process of scanning an image of a document to acquire image data. If executing a print job, the CPU 101 acquires PDL data stored (held) in a storage device such as the HDD 104, and starts a process of controlling the RIP 111 to generate raster-format image data.

The CPU 101 executes processing of steps S305 to S308 described below in parallel to executing the job started in step S304. For the processing of steps S305 to S308, the display unit 12, the operation unit 13, and the like are used. Note that in jobs for copying, scanning, scan transmission, FAX transmission, and the like, text information, obtained by OCR processing from image data obtained by scanning an image of a document, is used in step S302. Therefore, with respect to these types of jobs, the processing of step S304 may be executed (i.e., the execution of the job may be started) prior to the execution of the processing of step S302, and the processing of step S302, step S303, and steps S305 to S308 may be executed in parallel with the execution of the job.

In step S305, the CPU 101 determines whether or not there is content estimated to be a related document that is related to a document included in the job being executed, based on results of the processing of step S302 and step S303. The CPU 101 advances the processing to step S306 if there are one or more related documents (relevant content) ("YES" in step S305). On the other hand, if no related document exists ("NO" in step S305), the CPU 101 does not display a related document, and ends the process after the completion of the execution of the job.

In step S306, the CPU 101 uses the display unit 12 to display to the user that there is content estimated to be a related document that is related to a document included in the job being executed, obtained as results of the processing of step S302 and step S303.

Figure 5:
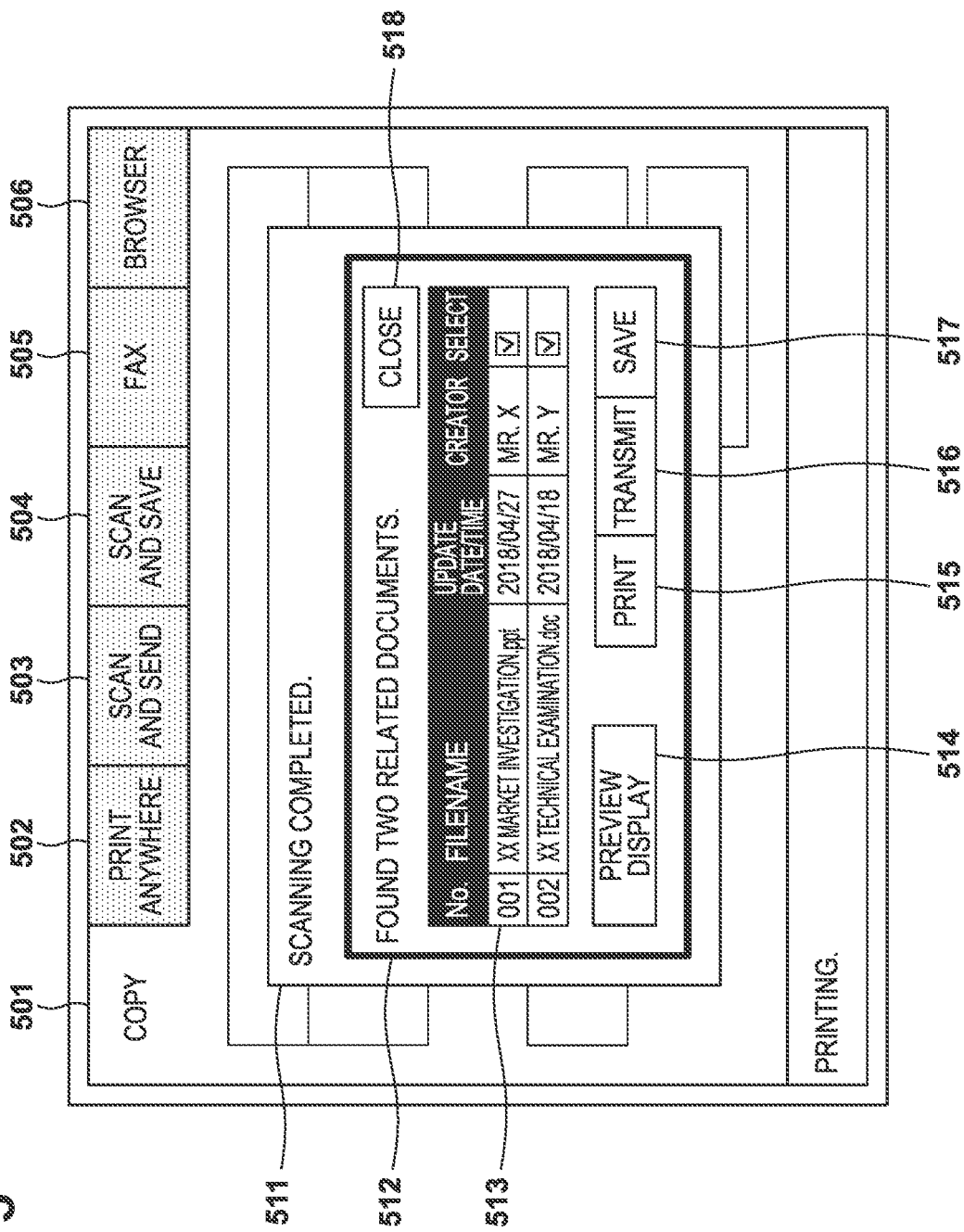
FIG. 5 is a diagram illustrating an example of an operation screen for recommending a related document.

FIG. 5 illustrates an example of an operation screen displayed on the display unit 12 for recommending related documents to the user in step S306. In the screen of FIG. 5, tabs 501 to 506 for switching and displaying screens corresponding to a plurality of functions provided by the image processing apparatus 10 to the user are provided. In this example, tabs 501 to 506 are used to instruct the display of screens corresponding to functions of "copy", "print anywhere", "scan and send", "scan and save", "FAX", and "browser".

FIG. 5 illustrates an example in which, during execution of the copy job, a notification window 511 indicating that scanning of images by the scanner unit 14 is completed is displayed, and a message indicating that printing by the printer unit 15 is being executed is displayed. In this example, the CPU 101 further displays a notification window 512, and displays, in this window, information indicating that related documents having a high degree of similarity to document content of text information included in the OCR result for the image data obtained by scanning were located.

In the notification window 512, a summary of two located related documents is displayed as a relevant document list 513, and selectable checkboxes are provided for the related documents. The notification window 512 is further provided with instruction buttons 514-517 for displaying or outputting these related documents. For example, if a preview display button 514 is selected (e.g., touched), a preview screen for respective pages included in the document file may be displayed for document files for which the checkbox is selected among the document files included in the relevant document list 513.

Although FIG. 5 illustrates display control in a case where a copy job is executed, similar display control can be performed in cases where jobs corresponding to other functions such as "print anywhere", "scan and send", "scan and save", "FAX", and "browser" are executed. Note that the "print anywhere" function is a function by which PDL data stored in a particular image processing apparatus 10 can be referenced for printing from another image processing apparatus 10, in a configuration in which a plurality of the image processing apparatuses 10 are connected to the network 20.

For example, in a case where a "print anywhere" job is executed, a related document (relevant content) having a high degree of similarity to document content of text information included in PDL data of a print job corresponding to the image processing apparatus 10 is searched for (step S303). In addition, information related to a located related document is displayed (step S306) in the notification window 512.

In a case where a scan transmission or scan save job is executed, as in the case of executing a copy job, a related document (relevant content) having a high degree of similarity to document content of text information included in an OCR result for image data obtained by scanning is searched for (step S303). In addition, information related to a located related document is displayed (step S306) in the notification window 512.

In a case where a FAX transmission job is executed, a related document (relevant content) having a high degree of similarity to document content of text information included in the OCR result for the image data to be transmitted/received by FAX is searched for (S303). In addition, information related to a located related document is displayed (step S306) in the notification window 512.

In a case where the browser function is executed, a related document (relevant content) having a high degree of similarity to document content of text information included in HTML data used in a display by the browser is searched for (S303). In addition, information related to a located related document is displayed (step S306) in the notification window 512.

Note that, in step S306, the CPU 101 may display, in the notification window 512, content that satisfies a predetermined condition, out of one or more pieces of relevant content retrieved in step S303. The predetermined condition may include that it is, for example, content stored in a DB in the server apparatus 50 for which the target user has an access right, or content having a degree of similarity equal to or greater than a predetermined threshold. The predetermined condition may include that it is content corresponding to a new version of the same document as a document included in the job, or content having no log of the target user viewing the content. Further, the above-described predetermined condition may be set in advance for each user. For example, it may be possible to set whether or not to display relevant content for each user, and it may be possible to set the priority of display of one or more pieces of relevant content (for example, a priority order for display in relation to the plurality of conditions described above). In addition, a setting to switch the frequency at which relevant content is displayed in accordance with browsing frequency (the frequency of operation on the image processing apparatus 10) of each user may be possible.

Next, in step S307, the CPU 101 determines whether or not a cancel instruction with respect to the content displayed in step S306 has been inputted by the user via the operation unit 13. For example, the user can input a cancel instruction by selecting a close button 518 illustrated in FIG. 5. In a case where the CPU 101 accepts a cancel instruction, the CPU 101 controls the display unit 12 to end display of the content in accordance with the cancel instruction. If the CPU 101 accepts a cancel instruction with respect to the displayed content from the user ("YES" in step S307), it closes the notification window 512 displayed in step S306, and ends the process after the completion of executing the jobs. On the other hand, if the CPU 101 has not accepted a cancellation instruction from the user with respect to the displayed contents ("NO" in step S307), it advances the process to step S308.

In step S308, the CPU 101 accepts an output instruction from the user with respect to the content displayed in step S306 via the operation unit 13, and in accordance with the output instruction, outputs content estimated to be a related document. The CPU 101 accepts an output instruction to output a related document from the user made by using a button such as a print button 515, a transmission button 516, and a save button 517 illustrated in FIG. 5. In accordance with the accepted output instruction, the CPU 101 executes a job for outputting a related document according to a later-described procedure illustrated in FIG. 4.

<Processing for Outputting Related Document>

Figure 4:
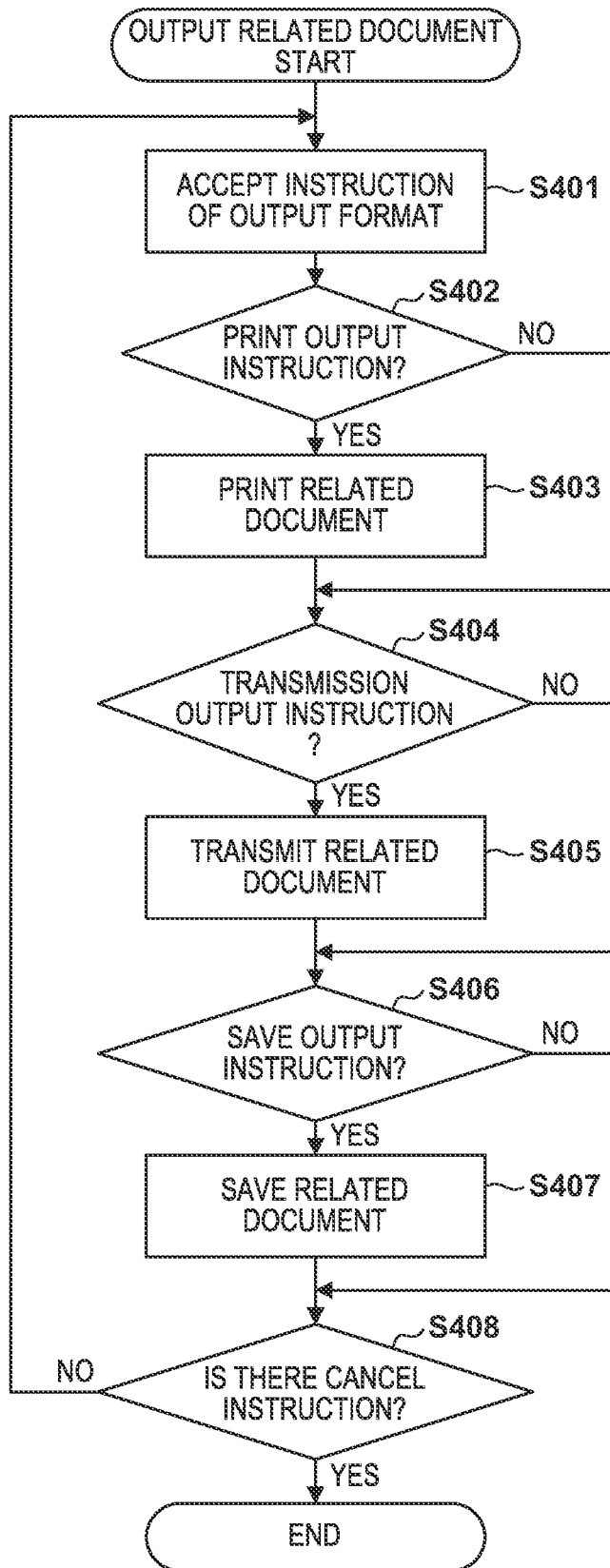
FIG. 4 is a flowchart illustrating a procedure of processing for outputting a related document.

FIG. 4 is a flowchart illustrating a procedure of processing for outputting a related document in the image processing system according to the present embodiment. The processing of each step illustrated in FIG. 4 is realized by the CPU 101 reading and executing programs stored in a storage device such as the RAM 102 or the ROM 103 in the image processing apparatus 10. Note that the processing of some of the steps illustrated in FIG. 3 may be executed by the server apparatus 50. In such a case, for example, a CPU of the DB management unit 51 may execute a program stored in a RAM or a ROM of the DB management unit 51 on the server apparatus 50 to realize this processing.

In step S401, the CPU 101 accepts an output instruction (instruction of an output form) with respect to the content displayed in step S306 of FIG. 3 from a user via the operation unit 13, and advances the processing to step S402. For example, the CPU 101 accepts a touch operation from the user in relation to instruction buttons 515 to 517 in the notification window 512 on the operation unit 13, thereby accepting an output instruction corresponding to a button on which the touch operation has been performed.

As described above, the notification window 512 is an example of an operation screen that includes information on a related document (relevant content) and that is for accepting a selection of an output form for the related document from a user. This operation screen selectably indicates, as a plurality of output forms, two or more of, for example, printing of a related document, transmitting of a related document to a predetermined destination, and saving of a related document to a predetermined save destination. In the notification window 512 of the present embodiment, these three output forms are indicated selectably as instruction buttons 515 to 517. The CPU 101 accepts, from the user via the notification window 512, selection of one of the plurality of output forms as an output instruction (in accordance with an operation on instruction buttons 515 to 517).

In step S402, the CPU 101 determines whether or not the accepted output instruction is a print output instruction, as with a touch operation in relation to the print button 515, for example. If the output instruction is a print output instruction ("YES" in step S402), the CPU 101 advances the processing to step S403, and if the output instruction is not a print output instruction ("NO" in step S402), the CPU 101 advances the processing to step S404.

In step S403, the CPU 101 generates a print job for printing of content corresponding to the related document displayed in step S306, and executes the generated print job. More specifically, the CPU 101 acquires, as PDL data, content corresponding to the related document stored in the document DB 52, interprets the content, and converts the content into a display list. The CPU 101 generates image data by performing a rendering process on the generated display list using the RIP 111. Thereafter, the CPU 101 outputs the generated image data to the printer unit 15 via the printer I/F 110, and causes the printer unit 15 to print, onto a recording medium, an image based on the image data. Note that the CPU 101 may perform aggregate printing by, for example, extracting pages having a high degree of similarity or performing a reduction layout so as to keep within a predetermined number of pages, with respect to one or more pieces of content for which the print output instruction was made by the user.

In step S404, the CPU 101 determines whether or not the accepted output instruction is a transmission output instruction, as with a touch operation in relation to the transmission button 516, for example. If the output instruction is a transmission output instruction ("YES" in step S404), the CPU 101 advances the processing to step S405, and if the output instruction is not a transmission output instruction ("NO" in step S404), the CPU 101 advances the processing to step S406.

In step S405, the CPU 101 generates a transmission job for transmitting content corresponding to the related document displayed in step S306, and executes the generated transmission job. More specifically, the CPU 101 acquires, as a document file, content corresponding to the related document stored in the document DB 52, and transmits, to the external apparatus via the network 20, an e-mail to which the document file is attached. The CPU 101 may acquire a document file path indicating a storage location of content corresponding to the related document stored in the document DB 52, and transmit an e-mail describing the document file path to the external apparatus without attaching the document file itself.

In step S406, the CPU 101 determines whether or not the accepted output instruction is a save output instruction, as with a touch operation in relation to the save button 517, for example. If the output instruction is a save output instruction ("YES" in step S406), the CPU 101 advances the processing to step S407, and if the output instruction is not a save output instruction ("NO" in step S406), the CPU 101 advances the processing to step S408.

In step S407, the CPU 101 generates a save job for saving content corresponding to the related document displayed in step S306, and executes the generated save job. More specifically, the CPU 101 acquires, as a document file, content corresponding to the related document stored in the document DB 52, and saves, to the USB device 30 via the USB I/F 108, electronic data of the document file. For example, the CPU 101 may select a box area designated by the user in the storage area of the HDD 104 as another storage destination for the document file, and store the electronic data of the document file in the box area. The CPU 101 may select a terminal apparatus 40 such as a PC or a tablet as a different storage destination for the document file, and store the electronic data of the document file in the terminal apparatus 40 by transferring the data via the network 20. In addition, the CPU 101 may select, as a different storage destination for the document file, for example, a server apparatus providing a cloud storage service available to the user, and store the electronic data of the document file in the server apparatus.

In step S408, the CPU 101 determines whether or not an instruction to cancel the outputting of the related document has been accepted from the user, as with a touch operation in relation to the close button 518, for example. In a case where the cancel instruction is accepted, the CPU 101 ends the processing for outputting the related document, and in a case where a cancel instruction is not accepted, the CPU 101 returns the processing to step S401, and once again waits for an instruction to output the related document. That is, by repeatedly executing the processing of steps S401 to S407, content estimated to be a related document can be output by arbitrarily using one or more output forms of print, transmission, and storage in accordance with a selection (output instruction) by the user.

Note that, when the related document is output in the respective output form by the processing in accordance with the procedure illustrated in FIG. 4, supplementary information for explaining the reason why the recommendation of the content corresponding to the related document was made may be further added to the output. For example, in a case where it is estimated that the degree of similarity is high by content-based filtering, information such as "a document in which the content of the XXXXX field is described" may be added. Also, in a case where it is estimated that the degree of similarity is high by cooperative filtering, information such as "a document that has been browsed by a person in the XXXXX business" may be added.

<Example of Setting Screen Related to Printing of Related Document>

FIG. 6 is a diagram illustrating an example of a setting screen for performing setting related to printing of a related document in step S403. Similar to the screen of FIG. 5, the screen of FIG. 6 is configured such that it is possible to switch between screens corresponding to a plurality of functions by operating the tabs 501 to 506. FIG. 6 illustrates an example in which a screen corresponding to the "print anywhere" function is displayed.

In a job list 601 in the screen of FIG. 6, one or more jobs selected in advance in the relevant document list 513 prior to a touch operation being performed on the print button 515 are added as new jobs to be executed, and displayed in a list. In the screen of FIG. 6, for example, control buttons 602 to 605 are provided for instructing to perform one of print setting, preview display, job deletion, and print initiation in relation to one or more jobs selected in the job list 601.

In FIG. 6, as an example, a print setting menu 611 is displayed upon selection of the control button 602 corresponding to print setting from among the control buttons 602 to 605. In the print setting menu 611, user instructions can be accepted for a number of print sheets and a number of copies 612, a print range 613, a color selection 614, and other settings 615, as detailed items. Further, an instruction to complete settings can be accepted by a close button 616. In the present embodiment, the print setting menu 611 is an exemplary setting screen for performing print settings for a print job for printing a related document (relevant content).

For example, the CPU 101 may automatically change the print range 613 to "Let the system decide (aggregate print)" in a case where an instruction is accepted from the user to output a smaller number of sheets than the actual number of sheets as the setting of the number of print sheets and the number of copies 612 for one or more selected jobs. In this instance, the CPU 101 may automatically extract, as print target pages, pages having a high degree of similarity among the selected related documents, so as to keep within the set number of sheets. Alternatively, the CPU 101 may perform aggregate printing (aggregation printing) by automatically rearranging a plurality of pages included in the related documents using a reduction layout such as a Nin1, so as to keep within the set number of sheets.

Further, for example, as the setting of the print range 613, in a case where a range changed by the user instruction is accepted, custom (manual) aggregate printing may be performed so that only requested pages requested by the user instruction are printed. Thereafter, the CPU 101 updates and displays setting values such as print settings, the number of sheets, the number of copies, and the estimated time of the job list 601 for detailed items 612 to 615 in accordance with a user instruction.

Although FIG. 6 illustrates a specific example of the print settings according to selection of the control button 602, for example, the print range may be configured to be selectable in the preview display performed upon selection of a control button 603. The CPU 101 deletes or executes selected jobs in a case where a user instruction made by a selection of control button 604 or 605 in relation to one or more selected job in the job list 601 is accepted.

<Example of Setting Screen Related to Saving of Related Document>

Figure 7:
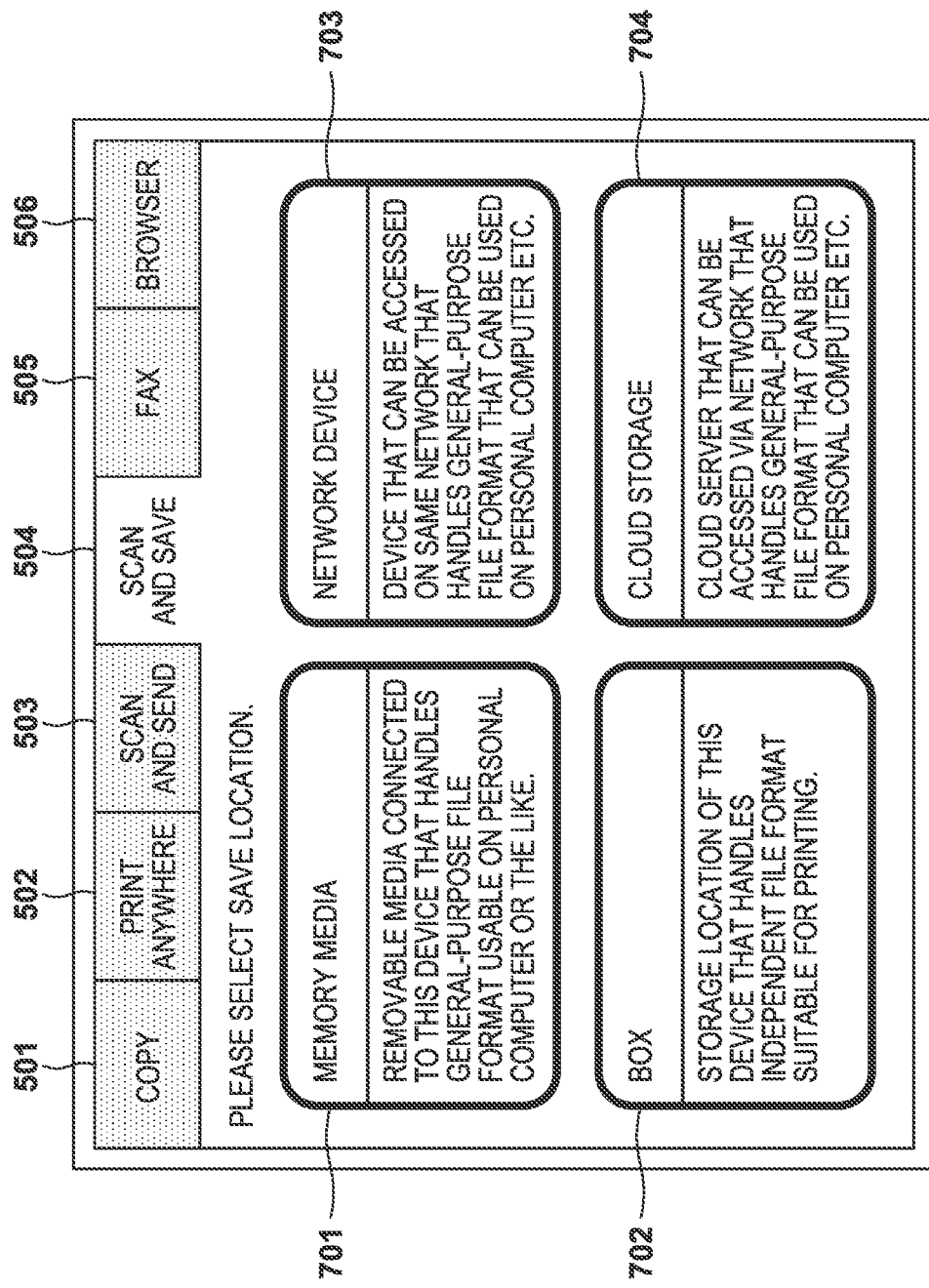
FIG. 7 is a diagram illustrating an example of a setting screen for performing setting related to saving of a related document.

FIG. 7 is a diagram illustrating an example of a setting screen for performing setting related to saving of a related document in step S407. Similar to the screen of FIG. 5, the screen of FIG. 7 is configured such that it is possible to switch between screens corresponding to a plurality of functions by operating the tabs 501 to 506. FIG. 7 illustrates an example in which a screen corresponding to the "scan and save" function is displayed.

In the screen of FIG. 7, memory media 701, a box 702, a network device 703, and a cloud storage 704 are selectably displayed as examples of storage destinations for storing a related document. For example, in a case where the memory media 701 is selected, the CPU 101 acquires, as a document file, content corresponding to the related document stored in the document DB 52, and stores the electronic data of the document file in the USB device 30. The USB device 30 is an exemplary external storage medium that can be detached from the image processing apparatus 10. In a case in which the box 702 is selected, the CPU 101 selects a box area designated by the user in the storage area of the HDD 104, and stores the electronic data of the document file in the box area.

In a case where the network device 703 is selected, the CPU 101 selects a terminal apparatus 40 such as a PC or a tablet, and stores the electronic data of the document file in the terminal apparatus 40 by transferring the data via the network 20. In a case where the cloud storage 704 is selected, the CPU 101 selects the server apparatus 50 that provides the cloud storage services available to the user via the network 20, and stores the electronic data of the document file in the server apparatus 50.

As described above, the image processing apparatus 10 of the present embodiment acquires relevant content related to a document included in a job inputted into the apparatus, and displays the acquired relevant content (a related document) on the display unit 12. The image processing apparatus 10 accepts from a user a selection of one of a plurality of output forms as an output form for the relevant content displayed on the display unit 12. Further, the image processing apparatus 10 generates a job for outputting the relevant content in the output form accepted from the user, and controls execution of the generated job.

As described above, when displaying the acquired relevant content on the display unit 12, the image processing apparatus 10 displays a plurality of output forms (e.g., printing, transmission to a predetermined destination, and save to a predetermined save destination) as output forms for the relevant content that can be selected by the user. Accordingly, when the user is provided with relevant content related to a document included in a job inputted into the image processing apparatus 10, it becomes possible for the user to select an appropriate output form for viewing the content.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148853, filed Aug. 7, 2018, which is hereby incorporated by reference herein in its entirety.

What is claimed is:

1. An image processing apparatus comprising:
   a memory that stores a program; and
   a processor that executes the program to perform:
   receiving a first job for outputting a first document;
   searching for a second document that relates to the first document included in the received first job, wherein the second document is different from the first document;
   controlling to execute the received first job;
   controlling to display the searched-for second document on a display unit of the image processing apparatus;
   selecting, as an output form to be executed for the second document, one output form from among a plurality of output forms based on a user's instruction;
   generating a second job for outputting the second document in the selected one output form, wherein the generated second job is different from the first job; and
   controlling to execute the generated second job.

2. The image processing apparatus according to claim 1, wherein
   the displayed second document is included in an operation screen displayed on the display unit, and
   wherein the one output form to be executed for the second document is selected via the displayed operation screen based on the user's instruction.

3. The image processing apparatus according to claim 1, wherein
   the plurality of output forms include two or more of printing of the second document, transmitting of the second document to a predetermined destination, and saving of the second document to a predetermined save destination.

4. The image processing apparatus according to claim 3, wherein
   in a case where the printing is selected as the selected one output form, the generated second job is a print job for printing the second document, and
   wherein the processor executes the program to further perform:
   adding the generated print job to a list of jobs to be executed; and
   controlling the display unit to display a setting screen for performing print setting for the print job.

5. The image processing apparatus according to claim 4, wherein
   the setting screen allows setting of a number of sheets to be printed for when printing the second document, and
   in a case where the number of sheets to be printed is set via the setting screen, the processor automatically extracts one or more pages to be printed from a plurality of pages included in the second document so as to keep within the set number of sheets.

6. The image processing apparatus according to claim 4, wherein
   the setting screen allows setting of a number of sheets to be printed for when printing the second document, and
   in a case where the number of sheets to be printed is set via the setting screen, the processor performs an aggregate printing by automatically rearranging a plurality of pages included in the second document so as to keep within the set number of sheets.

7. The image processing apparatus according to claim 3, wherein
   in a case where the transmitting is selected as the selected one output form, the generated second job is a transmission job for transmitting an e-mail with the second document attached thereto to an external apparatus or a transmission job for transmitting an e-mail in which a file path indicating a storage location of the second document is described.

8. The image processing apparatus according to claim 3, wherein
in a case where the storing is selected as the selected one output form, the processor further controls the display unit to display a setting screen for setting a save destination to which the second document is to be stored, and
in the setting screen, one or more of an external storage medium that can be detached from the image processing apparatus, a storage device of the image processing apparatus, a terminal apparatus that can communicate with the image processing apparatus, and a storage service available via a network is displayed as a selectable save destination.

9. The image processing apparatus according to claim 1, wherein
the second document is acquired by analyzing the first document included in the received first job, and searching a database of a server apparatus with which the image processing apparatus can communicate for the second document related to the analyzed document.

10. The image processing apparatus according to claim 1, further comprising
a print unit configured to print an image on a recording medium.

11. A method for controlling an image processing apparatus, the method comprising:
receiving a first job for outputting a first document;
searching for a second document that relates to the first document included in the received first job, wherein the second document is different from the first document;
controlling to execute the received first job;
displaying the searched-for second document on a display unit of the image processing apparatus;
selecting, as an output form to be executed for the second document, one output form from among a plurality of output forms based on a user's instruction;
generating a second job for outputting the second document in the selected one output form, wherein the generated second job is different from the first job; and
controlling to execute the generated second job.

12. The method according to claim 11, wherein
the displayed second document is included in an operation screen displayed on the display unit, and
wherein the one output form to be executed for the second document is selected via the displayed operation screen based on the user's instruction.

13. The method according to claim 11, wherein
the plurality of output forms includes two or more of printing of the second document, transmitting of the second document to a predetermined destination, and saving of the second document to a predetermined save destination is displayed on the display unit.

14. The method according to claim 13, wherein
in a case where the printing is selected as the selected one output form, the generated second job is a print job for printing the second document, and the generated print job is added to a list of jobs to be executed; and
a setting screen for performing print setting for the print job is displayed on the display unit.

15. The method according to claim 14, wherein
the setting screen allows setting of a number of sheets to be printed for when printing the second document, and
in a case where the number of sheets to be printed is set via the setting screen, one or more pages to be printed are extracted from a plurality of pages included in the second document so as to keep within the set number of sheets.

16. The method according to claim 14, wherein
the setting screen allows setting of a number of sheets to be printed for when printing the second document, and
in a case where the number of sheets to be printed is set via the setting screen, an aggregate printing is performed by automatically rearranging a plurality of pages included in the second document so as to keep within the set number of sheets.

17. The method according to claim 13, wherein
in a case where the transmitting is selected as the selected one output form, the generated second job is a transmission job for transmitting an e-mail with the second document attached thereto to an external apparatus or a transmission job for transmitting an e-mail in which a file path indicating a storage location of the second document is described.

18. The method according to claim 13, wherein
in a case where the storing is selected as the selected one output form, a setting screen for setting a save destination to which the second document is saved is displayed on the display unit, and
in the setting screen, one or more of an external storage medium that can be detached from the image processing apparatus, a storage device of the image processing apparatus, a terminal apparatus that can communicate with the image processing apparatus, and a storage service available via a network is displayed as a selectable save destination.

19. The method according to claim 11, wherein
the second document is acquired by analyzing the first document included in the received first job and searching a database of a server apparatus with which the image processing apparatus can communicate for the second document related to the analyzed document.

20. A non-transitory computer-readable storage medium storing a computer program for causing a computer to perform:
receiving a first job for outputting a first document;
searching for a second document that relates to the first document included in the received first job, wherein the second document is different from the first document;
controlling to execute the received first job;
displaying the searched-for second document on a display unit of the image processing apparatus;
selecting, as an output form to be executed for the second document, one output form from among a plurality of output forms based on a user's instruction;
generating a second job for outputting the second document in the selected one output form, wherein the generated second job is different from the first job; and
controlling to execute the generated second job.

* * * * *